US012681169B2

(12) United States Patent
   Gubbi Lakshminarasimha et al.

(10) Patent No.:  US 12,681,169 B2
(45) Date of Patent:        Jul. 14, 2026

(54) METHOD AND SYSTEM FOR LULC GUIDED SAR VISUALIZATION

(71) Applicant: Tata Consultancy Services Limited, Mumbai (IN)

(72) Inventors: Jayavardhana Rama Gubbi Lakshminarasimha, Bangalore (IN); Ram Prabhakar Kathirvel, Bangalore (IN); Veera Harikrishna Nukala, Bangalore (IN); Balamuralidhar Purushothaman, Bangalore (IN); Arpan Pal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 441 days.

(21) Appl. No.: 18/331,384

(22) Filed: Jun. 8, 2023

(65) Prior Publication Data

US 2023/0408682 A1      Dec. 21, 2023

(30) Foreign Application Priority Data

Jun. 20, 2022    (IN) .............................. 202221035281

(51) Int. Cl.
   *G01S 13/90*          (2006.01)
   *G01S 7/41*           (2006.01)
(52) U.S. Cl.
   CPC .......... *G01S 13/9027* (2019.05); *G01S 7/417* (2013.01); *G06T 2207/10044* (2013.01); *G06T 2207/20081* (2013.01); *G06T 2207/30181* (2013.01)
(58) Field of Classification Search
   CPC ................. G01S 13/9027; G01S 7/417; G06T 2207/10044; G06T 2207/20081; G06T 2207/30181
   See application file for complete search history.

(56) References Cited

U.S. PATENT DOCUMENTS

| | | | | |
|---|---|---|---|---|
| 12,277,193 | B1 * | 4/2025 | Weber ..................... | G06T 11/00 |
| 2022/0156492 | A1 * | 5/2022 | Basu ......................... | G06T 5/50 |
| 2022/0335715 | A1 * | 10/2022 | Geach ................. | G01S 13/9004 |

OTHER PUBLICATIONS

Xi Yang et al. "FG-GAN: A Fine-Grained Generative Adversarial Network for Unsupervised SAR-to-Optical Image Translation," IEEE Transactions on Geoscience and Remote Sensing, 2022, IEEE, https://arxiv.org/pdf/2011.11314.pdf (Year: 2022).*

(Continued)

*Primary Examiner* — Vladimir Magloire
*Assistant Examiner* — Nazra Nur Waheed
(74) *Attorney, Agent, or Firm* — Finnegan, Henderson, Farabow, Garrett & Dunner, LLP

(57)                ABSTRACT

Optical images in remote sensing are contaminated by cloud cover and bad weather conditions and are only available during the daytime. Whereas SAR images are completely cloud free, independent of weather conditions and can be acquired both during the day and at night. However, due to the speckle effect and side looking imaging mechanism of SAR images, they are not easily interpretable by untrained people. To address this issue, the present disclosure provides a method and system for LULC guided SAR visualization, wherein a GAN is trained to translate SAR images to optical images for visualization. A given SAR image is fed into a first generator of the GAN to obtain LULC map which is then concatenated with the SAR image and fed into a second generator of the GAN to generate an optical image. The LULC map provides semantic information required for generation of more realistic optical image.

9 Claims, 3 Drawing Sheets

(56)                   References Cited

OTHER PUBLICATIONS

Xun Liu et al., "Modality Translation in Remote Sensing Time Series," IEEE Transactions on Geoscience and Remote Sensing, Date: 2021, IEEE, https://openremotesensing.net/wp-content/uploads/2021/05/2021_IEEE_TGRS_Modality_Translation.pdf.

Gerald Baier et al, "Synthesizing Optical and SAR imagery from Land Cover Maps and Auxiliary Raster Data," IEEE Transactions on Geoscience and Remote Sensing, 2021, IEEE, https://arxiv.org/pdf/2011.11314.pdf.

Xi Yang et al. "FG-GAN: A Fine-Grained Generative Adversarial Network for Unsupervised SAR-to-Optical Image Translation," IEEE Transactions on Geoscience and Remote Sensing, 2022, IEEE, https://arxiv.org/pdf/2011.11314.pdf.

* cited by examiner

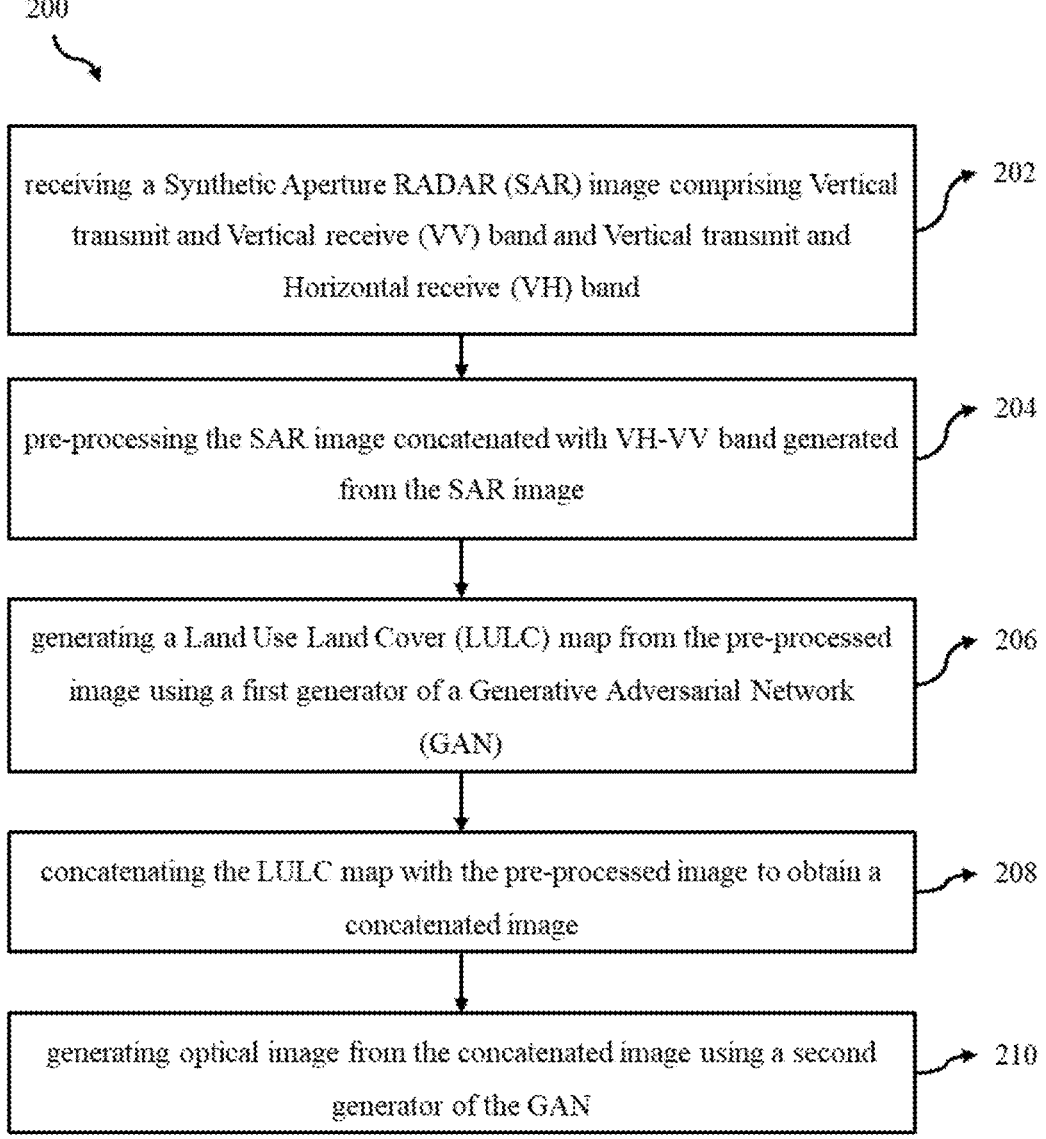

200 receiving a Synthetic Aperture RADAR (SAR) image comprising Vertical transmit and Vertical receive (VV) band and Vertical transmit and Horizontal receive (VH) band — 202 pre-processing the SAR image concatenated with VH-VV band generated from the SAR image — 204 generating a Land Use Land Cover (LULC) map from the pre-processed image using a first generator of a Generative Adversarial Network (GAN) — 206 concatenating the LULC map with the pre-processed image to obtain a concatenated image — 208 generating optical image from the concatenated image using a second generator of the GAN — 210

FIG. 2

METHOD AND SYSTEM FOR LULC GUIDED SAR VISUALIZATION

PRIORITY CLAIM

This U.S. patent application claims priority under 35 U.S.C. § 119 to: Indian Patent Application No. 202221035281, filed on Jun. 20, 2022. The entire contents of the aforementioned application are incorporated herein by reference.

TECHNICAL FIELD

The disclosure herein generally relates to the field of satellite imaging, and, more particularly, to method and system for Land Use Land Cover (LULC) guided Synthetic Aperture Radar (SAR) visualization.

BACKGROUND

In remote sensing, electro-optical data, and Synthetic Aperture RADAR (SAR) data plays a significant role in addressing numerous earth observation tasks such as Land use Land cover classification, change detection, disaster management, time-series analysis and so on. However, both optical imaging and SAR imaging have their own limitations. The quality of optical remote sensing data diminishes very easily in poor atmospheric conditions and frequent cloud covers. Also, these images cannot be captured during night or poor illumination conditions due to the passive nature of optical sensors. SAR sensors, on the other hand, are active in nature which means they have their own illumination source. So, SAR images can be collected both during the day and at night. Furthermore, the operational wavelength of SAR sensors is longer than that of optical sensors, making SAR images penetrate through clouds and acquire images which are least affected by atmospheric conditions. So, the SAR image is an ideal solution for most remote sensing problems especially when optical image is corrupted or unavailable.

However, unlike optical images, interpretation of the SAR images is challenging for inexperienced people, mainly because of the following three reasons: (i) SAR images have geometric distortions like foreshortening, shadows and so on due to the side looking imaging mechanism of SAR sensor; (ii) SAR images may have multiplicative noise known as speckle which is caused by the constructive and destructive interference of multiple RADAR back scattered signals within single resolution cell; and (iii) processed SAR images only have RADAR back-scattered reflectance values and do not contain any colour information. Also, these reflectance values are highly dependent on the sensor wavelength and physical properties of the target. Therefore, the information is not consistent. These issues make the SAR images uninterpretable by untrained people. So, translating SAR image into an optical image such as RGB image helps inexperienced people to visualize and interpret SAR images.

Over the years, many approaches are proposed to make the SAR images more suitable for visual recognition. These approaches can be broadly classified into two categories: pseudo colorization techniques and image enhancement techniques. The pseudo colourization techniques use unique colours to encode the pixels. These techniques are mostly applied to dual or fully polarized SAR images based on surface scattering mechanism of different polarization bands. The SAR images that have been pseudo-colourized can then be utilized in other SAR image applications. On the other hand, the goal of the image enhancement algorithms is to make the objects in SAR images clearer to successfully produce an image that is suitable for human interpretation. One of the state-of-the-art techniques introduced an adaptive two scale enhancement method to visualize manmade objects like aircrafts and ocean vessels using high resolution SAR imagery. Another state-of-the-art technique reduced the dynamic range of SAR images via global optimum entropy maximization with reflectivity distortion constraint. SAR images processed using these methods became more suitable for visual recognition by experts, but they remained substantially different from optical remote sensing images. Thus, better approaches are explored for SAR image visualization and interpretation.

With the advancement of deep learning methods to learn and represent complex features, they can be used to address the image-to-image translation problems. One of the methods ("Generating high quality visible images from SAR images using CNNs," 2018 IEEE Radar Conference (Radar-Conf18), 2018, pp. 0570-0575, doi: 10.1109/RA-DAR.2018.8378622) proposed a two-stage network for despeckling and colorization of SAR images using convolutional neural networks but it leads to the loss of relevant image contents and location accuracy, as a result of possible geometric changes. Another method (G. Baier, A. Deschemps, M. Schmitt and N. Yokoya, "Synthesizing Optical and SAR Imagery From Land Cover Maps and Auxiliary Raster Data," in IEEE Transactions on Geoscience and Remote Sensing, vol. 60, pp. 1-12, 2022, Art no. 4701312, doi: 10.1109/TGRS.2021.3068532) synthesize optical and SAR data from auxiliary raster data like land cover maps and digital elevation models (DEMs) which are difficult to obtain.

In recent years, Generative Adversarial networks (GANs) have become popular and widely used deep learning method in several fields like synthetic data generation, domain translation from image to image or text to image, colouring and so on. GANs are probabilistic generative models. By training the GAN models on massive amounts of data, they can learn the internal data distribution. GANs generate data without supervision and do not have any control over the data generation process. To address this issue, Conditional Generative Adversarial Networks (cGANs) are developed. The data generation process of cGANs is guided by conditioning the models on additional information. Several unsupervised and supervised GAN based approaches such as Dual GAN, Cycle-Consistent Adversarial Networks (Cycle-GAN), pix2pix etc. have been proposed for image-to-image translation problems. CycleGAN and pix2pix are two well-known GAN based methods available in the art for SAR to RGB image translation tasks. But both the CycleGAN and pix2pix have their own disadvantages. CycleGAN follows the unsupervised approach and can retain structural information very well but fails to preserve the land cover information. In contrast, pix2pix is the supervised approach that can retain colour information but produces blurry results and structural information is lost for some land cover classes.

SUMMARY

Embodiments of the present disclosure present technological improvements as solutions to one or more of the above-mentioned technical problems recognized by the inventors in conventional systems. For example, in one embodiment, a method for LULC guided SAR visualization is provided. The method includes receiving a Synthetic Aperture RADAR (SAR) image comprising Vertical transmit and Vertical receive (VV) band and Vertical transmit and Horizontal receive (VH) band. Further, the method includes pre-processing the SAR image concatenated with VH/VV band generated from the SAR image and generating a Land Use Land Cover (LULC) map from the pre-processed image using a first generator of a Generative Adversarial Network (GAN). Furthermore, the method includes concatenating the LULC map with the pre-processed image to obtain a con-catenated image and generating optical image from the concatenated image using a second generator of the GAN for visualizing the SAR image.

In another aspect, a system for LULC guided SAR visualization is provided. The system includes: a memory storing instructions; one or more communication interfaces; and one or more hardware processors coupled to the memory via the one or more communication interfaces, wherein the one or more hardware processors are configured by the instructions to: receive a Synthetic Aperture RADAR (SAR) image comprising Vertical transmit and Vertical receive (VV) band and Vertical transmit and Horizontal receive (VH) band. Further the one or more hardware processors are configured to pre-process the SAR image concatenated with VH/VV band generated from the SAR image and generate a Land Use Land Cover (LULC) map from the pre-processed image using a first generator of a Generative Adversarial Network (GAN). Furthermore, the one or more hardware processors are configured to concat-enate the LULC map with the pre-processed image to obtain a concatenated image and generate optical image from the concatenated image using a second generator of the GAN for visualizing the SAR image.

In yet another aspect, there are provided one or more non-transitory machine-readable information storage medi-ums comprising one or more instructions which when executed by one or more hardware processors cause a method for LULC guided SAR visualization. The method includes receiving a Synthetic Aperture RADAR (SAR) image comprising Vertical transmit and Vertical receive (VV) band and Vertical transmit and Horizontal receive (VH) band. Further, the method includes pre-processing the SAR image concatenated with VH/VV band generated from the SAR image and generating a Land Use Land Cover (LULC) map from the pre-processed image using a first generator of a Generative Adversarial Network (GAN). Furthermore, the method includes concatenating the LULC map with the pre-processed image to obtain a concatenated image and generating optical image from the concatenated image using a second generator of the GAN for visualizing the SAR image.

It is to be understood that both the foregoing general description and the following detailed description are exem-plary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram illustrating a method for LULC guided SAR visualization, according to some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the draw-ings to refer to the same or like parts. While examples and features of disclosed principles are described herein, modi-fications, adaptations, and other implementations are pos-sible without departing from the scope of the disclosed embodiments.

Remote sensing data captured in optical modality suffers from cloud cover and invisible during poor illumination conditions. SAR images can handle these issues but are not easily interpretable. Translating SAR images to optical images overcomes these drawbacks. However, conventional methods used in SAR visualization face several challenges. Thus, the embodiments of present disclosure provide a method and system for SAR visualization guided by Land Use Land Cover (LULC) data using a Generative Adver-sarial Network (GAN). The GAN comprises two generators and a discriminator during training. Once the GAN is trained, the discriminator is removed and only the two generators are used for SAR visualization task. The first generator generates a LULC map from the input SAR image. Then, the generated LULC map is concatenated with the SAR image and fed into the second generator which gen-erates an optical image. The generated optical image enables SAR visualization which can be easily interpreted by an expert as well as an untrained person. The LULC map provides semantic information due to which the generated optical image can be visualized in a better way than the state-of-art methods.

Figure 1:
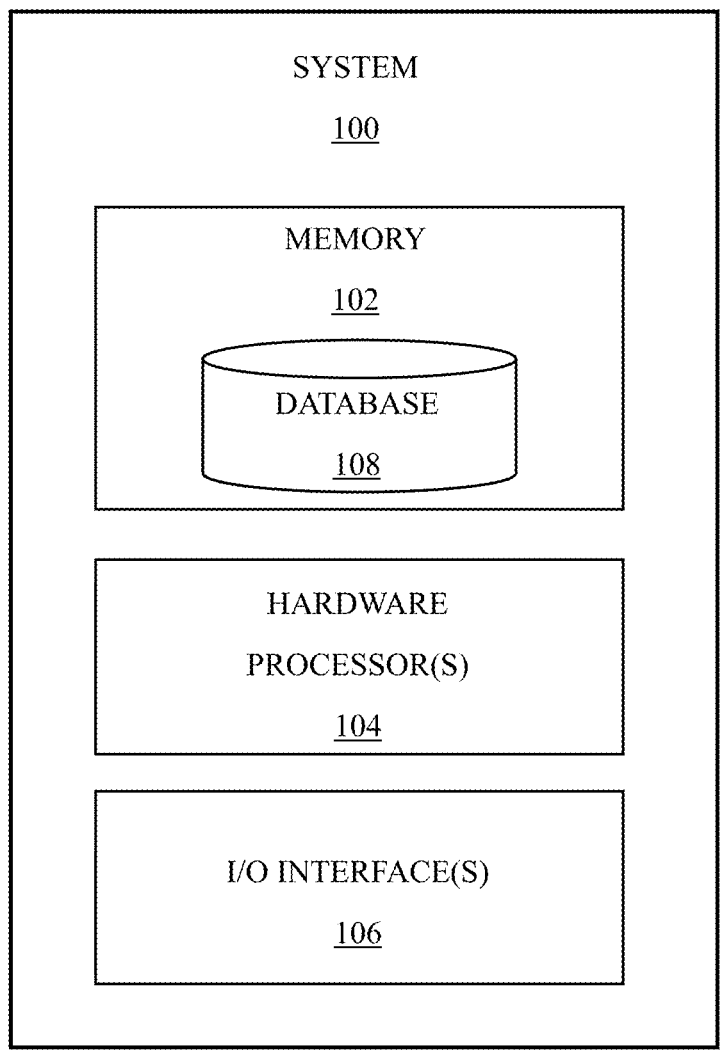
FIG. 1 illustrates an exemplary block diagram of a system for Land Use Land Cover (LULC) guided Synthetic Aper-ture RADAR (SAR) visualization, according to some embodiments of the present disclosure.
Figure 3:
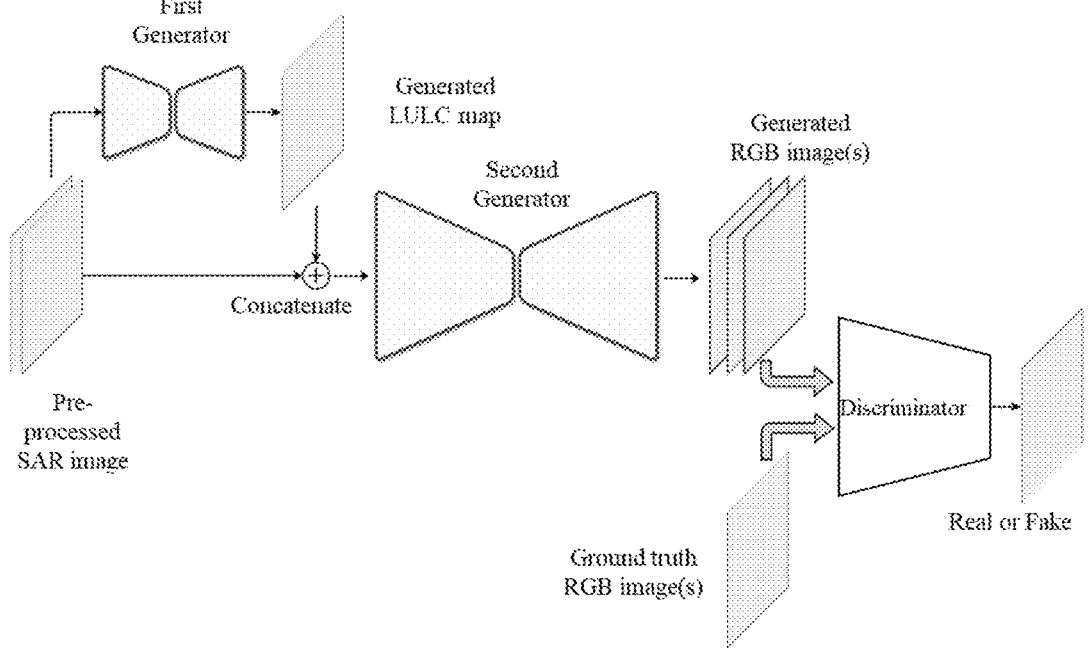
FIG. 3 is a block diagram illustrating process of training a Generative Adversarial Network (GAN) which is used in the method illustrated in FIG. 2, according to some embodi-ments of the present disclosure.

Referring now to the drawings, and more particularly to FIGS. 1 to 3, where similar reference characters denote corresponding features consistently throughout the figures, there are shown preferred embodiments and these embodi-ments are described in the context of the following exem-plary system and/or method.

FIG. 1 illustrates an exemplary block diagram of a system 100 for LULC guided SAR translation. In an embodiment, the system 100 includes one or more processors 104, com-munication interface device(s) 106 or Input/Output (I/O) interface(s) 106 or user interface 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute com-puter-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web inter-face, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) 106 receives training dataset and SAR image to be visualized as input and provides optical image as output. The memory 102 may include any computer-readable medium known in the art including, for example, volatile memory, such as Static Random-Access Memory (SRAM) and Dynamic Random-Access Memory (DRAM), and/or non-volatile memory, such as read only memory (ROM), erasable programmable ROM, flash memories, hard disks, optical disks, and magnetic tapes. The database 108 may store information but not limited to information associated with at least one of: training dataset, trained generators, weights of the trained generators, domain knowledge, semantic knowledge and so on. Further, the database 108 stores information pertaining to inputs fed to the system 100 and/or outputs generated by the system (e.g., at each stage), specific to the methodology described herein. Functions of the components of system 100 are explained in conjunction with flow diagram depicted in FIG. 2 and block diagram of FIG. 3 for Land Use Land Cover (LULC) guided Synthetic Aperture Radar (SAR) visualization.

In an embodiment, the system 100 comprises one or more data storage devices or the memory 102 operatively coupled to the processor(s) 104 and is configured to store instructions for execution of steps of the method depicted in FIG. 2 by the processor(s) or one or more hardware processors 104. The steps of the method of the present disclosure will now be explained with reference to the components or blocks of the system 100 as depicted in FIG. 1, the steps of flow diagram as depicted in FIG. 2 and the block diagram depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

FIG. 2 is a flow diagram illustrating a method 200 for LULC guided SAR visualization, according to some embodiments of the present disclosure. At step 202 of the method 200, the one or more hardware processors 104 are configured to receive a Synthetic Aperture RADAR (SAR) image comprising Vertical transmit and Vertical receive (VV) band and Vertical transmit and Horizontal receive (VH) band. Then, a new VH/VV band is generated from the SAR image by taking ratio of the VH band and the VV band. The new VH/VV band provides additional polarization information representing a unique signal and target interactions in both the bands. Further, at step 204 of the method 200, the one or more hardware processors 104 are configured to pre-process the SAR image concatenated with the new VH/VV band generated from the SAR image. For example, pre-processing is performed by truncating the 3 bands (VV, VH, VH/VV) between a predefined range such as between (−25, 0) dB and normalizing them (say between (−1,1)).

Once the pre-processing is done, at step 206 of the method 200, the one or more hardware processors 104 are configured to generate a Land Use Land Cover (LULC) map from the pre-processed image using a first generator of a Generative Adversarial Network (GAN). The GAN includes the first generator, a second generator and a discriminator which are trained by the process depicted in FIG. 3. As understood by a person skilled in the art, the LULC map comprises multiple classes. For example, the LULC map includes 8 classes, namely, forest, shrublands, grasslands, wetlands, croplands, urban, barren and water.

Once the LULC map is generated, it is concatenated with the pre-processed image to obtain a concatenated image at step 208 of the method 200. Further, at step 210 of the method 200, optical image is generated from the concatenated image using the second generator of the GAN for visualizing the SAR image.

FIG. 3 is a block diagram illustrating process of training a Generative Adversarial Network (GAN) which is used by the method 200, according to some embodiments of the present disclosure. As understood by a person skilled in the art, Generative adversarial networks (GANs) have two neural networks competing with each other a generator and a discriminator. Generator attempts to deceive the discriminator by producing realistic images and the discriminator attempts to classify if the generated images are real or fake. Both generator and discriminator are trained simultaneously until the generator generates images which the discriminator fails to differentiate. In an embodiment of present disclosure, an improved pix2pix which is a conditional GAN with UNet based generator and PatchGAN discriminator is used to translate a given SAR image to optical image. The input to the GAN is pre-processed SAR image comprising VV, VH and VH/VV bands. Pre-processing is done by truncating them between a predefined range such as (−25,0) dB and normalizing (say between (−1,1)). With pre-processed SAR image as input, the GAN is trained to predict optical images. Training the GAN to directly generate optical images from SAR has the following challenges: high frequency classes can dominate, and prediction cannot be semantically meaningful. To address these issues, LULC maps are used to guide the GAN and generate semantically plausible output optical images.

For training the GAN, initially a training dataset is received by the one or more hardware processors 104. The training dataset comprises: (i) a plurality of SAR images, (ii) a plurality of estimated LULC maps associated with each of the plurality of SAR images and (iii) one or more ground truth optical images associated with each of the plurality of SAR images. An example training dataset is the 2020 IEEE GRSS data fusion contest (DFC2020) dataset. It comprises data captured at seven diverse locations all around the world. 5128 image triplets are assigned to the training set and 986 image triplets are assigned to the testing set. Each image triplet (T) in the dataset comprises a dual polarized sentinel-1 SAR image, a 13-band sentinel-2 optical (alternatively referred as multi-spectral) image, and a corresponding land use land cover map (LULC). LULC maps have a ground resolution of 10 m and are spread across 8 semantic classes with unsymmetric class distribution. The sentinel-1 SAR images are Ground Range Detected products (GRD) and they include VV and VH bands with a spatial resolution of 20 m in range direction and 22.5 m in azimuth direction. The optical images have ten surface bands and three atmospheric bands with different band resolutions. The Red, Green, Blue and infrared bands are at 10 m resolution and the remaining surface bands are at 20 m resolution, whereas atmospheric bands have 60 m resolution. However, all the bands are resampled to 10 m ground resolution and co-registered at pixel level accuracy. Along with two polarization bands of SAR images, a new band VH/VV is generated for extra information. The new VH/VV band is concatenated with the remaining two polarization bands. All the three bands are pre-processed by truncating them between a predefined range such as between (−25, 0) dB and normalizing them (say between (−1,1)). Also, only the red (R), green (G), blue (B) bands of sentinel-2 optical image are extracted, truncated (say between (0,4500)) and normalized (say between (−1,1)) to obtain the one or more ground truth optical images.

Once the training dataset is received, the first generator is trained using the plurality of SAR images and the estimated LULC maps comprised in the training dataset to generate a plurality of LULC maps from the plurality of SAR images. In an embodiment, the first generator is trained with batch size 8, learning rate of $10^{-4}$ and Adam optimizer with momentum 0.9 for 200 epochs. A categorical cross entropy loss function (given by equation 1) is used to compute loss between generated LULC map and the LULC map in the training dataset.

$$-\sum_{c=1}^{M} y_{o,c}\log(p_{o,c}) \qquad (1)$$

In equation 1, M is the number of classes, $\gamma$ represents the binary indicator (0 or 1) if class label c is the correct classification for observation o and p is the predicted probability observation o is of class c.

Predicted LULC maps have the overall pixel accuracy of 63.47. The DFC2020 dataset is highly imbalanced towards some classes. To improve the GAN performance on minor classes, the class imbalance problem is solved by weighing the class-wise loss values with a weight vector of [40, 30, 40, 20, 40, 100, 30, 15]. The class weights are calculated depending on the frequency of a particular class in the training dataset. A common class is assigned a low weight, while a minor class is assigned a high weight. An exhaustive grid search is done to determine the exact weight vector. The first generator is trained separately, and the weights are frozen while using it in the method 200.

Once the first generator is trained, the generated LULC maps are concatenated with the plurality of SAR images to obtain a plurality of concatenated images. Further, the second generator and the discriminator are jointly trained for a plurality of training epochs. In an embodiment, the second generator and the discriminator are trained in alternative epochs. For example, the second generator is trained while discriminator is frozen in $1^{st}$ epoch, and discriminator is trained while second generator is frozen in the $2^{nd}$ epoch and so on. In another embodiment, the second generator is trained for a pre-defined number of epochs (such as 5, 10, etc.) while discriminator is frozen and vice versa. An example architecture of the second generator is a U-net architecture with encoder and decoder blocks. The encoder contains a couple of convolutional layers with stride 2, followed by ReLU (Rectified Linear Unit) activation. The decoder consists of a series of deconvolutional layers with stride similar to encoder, followed by a Leaky ReLU activation and a skip connection from the encoder. Tanh is used as the final activation layer to generate a three channel optical image. The MaxPooling layers in U-net architecture are replaced with strided convolutions for sharp results. The second generator is trained with learning rate of $2\times10^{-4}$, Adam optimizer with momentum of 0.5, and batch size of 8 for 200 epochs. An example architecture of the discriminator is a PatchGAN architecture which consists of a sequence of convolutional layers followed by Leaky ReLU activation to generate a binary patch which tells whether the optical image generated by the second generator is real or fake.

Standard GAN training procedure is followed to pass batches of real images (ground truth optical images) and fake images (generated optical images) to the discriminator and train it in turns. The discriminator is trained with learning rate of $10^{-4}$ and Adam optimizer with 0.5 momentum. Binary cross entropy loss function is used to determine classification loss of the discriminator based on which weights of the discriminator are updated in subsequent epoch.

During training, the second generator learns the translation between SAR domain (X) and optical domain (Y) with the help of paired set of training samples from both the domains. The second generator takes input from X domain and tries to generate images G2(x) which looks similar to the images of Y domain. The discriminator (D) tries to differentiate between real image (y) and fake image (G2(x)). An adversarial loss is calculated based on probabilities returned by the discriminator according to equation 2. Along with the adversarial loss, a supervised loss between generated optical images (G2(x)) and real/ground truth optical images (y) is calculated in order to retain land cover information. A combination of Structural SIMilarity index (SSIM) loss, Mean Square Error (MSE) loss and Mean Absolute Error (MAE) loss is used as the supervised loss. SS IM measures the similarity between generated optical image and ground truth optical image based on luminance, contrast and structure and is given in equation 3. MSE (given by equation 4) and MAE (given by equation 5) are the mean overseen data of the squared and absolute differences between true(yi) and predicted values(G(xi)) respectively. The supervised loss is calculated based on weighted average of SSIM, MSE and MAE loss with $\lambda$ value of 10 as given by equation 6. The second generator is updated based on combination of the adversarial loss and the supervised loss given by equation 7. In equation 7, $L_{GAN}$ denotes the adversarial loss, $L_{SUPERVISED}$ denotes the supervised loss and $\beta$ controls importance of the supervised loss which is determined by an expert.

$$L_{GAN}(G_2, D, X, Y) = \qquad (2)$$
$$\min_{G_2} \max_{D} \mathbb{E}_{y \sim P_{data(y)}}[\log D(y)] + \mathbb{E}_{x \sim p_x(x)}[1 - \log D(G_2(x))]$$

$$L_{SSIM}(X, Y) = 1 - \frac{(2\mu_x\mu_y + C_1) + (2\sigma_{xy} + C_2)}{(\mu_x^2 + \mu_y^2 + C_1)(\sigma_x^2 + \sigma_y^2 + C_2)} \qquad (3)$$

$$L_{MSE}(G_2(X), Y) = \sum_{i=1}^{N}(G_2(x_i) - y_i)^2 \qquad (4)$$

$$L_{MAE}(G_2(X), Y) = \sum_{i=1}^{N}|G_2(x_i) - y_i| \qquad (5)$$

$$L_{SUPERVISED} = L_{SSIM} + \lambda(L_{MSE} + L_{MAE}) \qquad (6)$$

$$L = L_{GAN} + \beta(L_{SUPERVISED}) \qquad (7)$$

EXPERIMENTS AND RESULTS

For the experiments, the method 200 is performed and the generated optical images are evaluated based on two downstream tasks. One is Land Use Land Cover LULC) classification to evaluate the semantic information of translated optical images and other is the topography estimation of particular scene which helps to approximate the corrupted Digital Elevation Models (DEM).

A. Training

DFC 2020 data set which contains paired set of SAR and optical images is used for training the model. First the pix2pix model comprising the second generator and the discriminator is trained with MAE loss as supervised loss to generate optical images only using SAR data as input. Then, the first generator is attached to pix2pix model to generate the LULC maps which are fed to the second generator along with SAR images to provide additional semantic information. Then, the second generator is fine-tuned. This was implemented using the TensorFlow implementation of pix2pix. Except the loss function the other training parameters were the same as pix2pix. For example, the input data normalization, batch size, learning rate were all used by default. MAE loss used in pix2pix was replaced with the loss function in equation 6.

B. Result

Table 1 shows quantitative comparison between the method 200 and state of art methods tested on DFC2020 test set. The state of art model is trained with identical training samples as GAN of the present disclosure and tested on DFC2020 for fair comparison.

TABLE 1

| S. No. | Model | SSIM |
|---|---|---|
| 1. | CycleGAN | 0.3782 |
| 3. | Pix2pix | 0.4683 |
| 4. | GAN of present disclosure | 0.7065 |

Table 2 presents the ablation experiments which shows importance of different GAN configurations. Baseline pix2pix which uses only SAR data as input gives 0.46 SSIM score, while the GAN using LULC maps along with the SAR images as input gives 0.5117 SSIM score. The GAN of present disclosure trained using the loss function given in equation 7 yields SSIM score. It was experimentally determined that despeckling the training and testing images boosts the results from 0.6889 SSIM score to

TABLE 2

| S. No. | Model | SSIM | FID |
|---|---|---|---|
| 1. | GAN of present disclosure trained using despeckled SAR images | 0.7065 | 1.548 |
| 2. | Baseline pix2pix without LULC map input | 0.4683 | 3.163 |
| 3. | GAN of present disclosure trained without MSE loss | 0.6865 | 1.990 |
| 4. | GAN of present disclosure trained without MAE loss | 0.6860 | 1.968 |
| 5. | GAN of present disclosure trained without SSIM loss | 0.5117 | 2.867 |
| 6. | GAN of present disclosure trained without despeckling SAR images | 0.6889 | 1.968 |

C. Downstream Tasks

Generated optical images from method 200 are almost visually consistent with ground truth images. But to know to what extent translated/generated images are useful in downstream tasks, two tasks are selected: (i) LULC classification and (ii) Height estimation.

(i) LULC classification: Land Use Land Cover (LULC) classification is a critical task for several applications such as forestry resource management, urban planning, change detection, damage assessment and so on. Continuous monitoring of land cover is not possible using optical imagery due to the data acquisition limitation of optical sensors at night and during bad weather conditions. In such cases, translated optical images generated from SAR images can be used to replace the degraded optical data. Table 3 illustrates the experiments to evaluate the semantic information of translated optical images. First the UNet model is trained using sentinel-2 optical images taken from DFC2020 dataset. Then the trained model is tested using both original sentinel-2 optical images and the translated optical images which are generated from sentinel-1 SAR images using method 200 which results in 63.47% and 51.7% pixel accuracy. Drop in pixel accuracy is because of domain shift between original and translated optical images which is still lesser shift when compared to domain shift between optical and SAR imagery. The model trained and tested on translated optical images generated using only SAR data gives 62.4% pixel accuracy which is almost consistent with the model trained and tested on original optical images. Finally, the model trained on translated optical images generated from both SAR images and LULC maps yields in pixel accuracy which is better compared to the model which uses original optical images, suggesting the lesser domain shift for translated optical images within data and across different locations. These experiments prove that the translated optical images can be used as replacement of original optical images degraded by clouds and unfavourable acquisition conditions. All the experiments use DFC2020 dataset and UNet model trained with learning rate of $10^{-4}$ and Adam optimizer with 0.9 momentum and categorical cross entropy loss function to predict 8 class LULC maps.

TABLE 3

| S. No. | Train | Test | Pixel Accuracy |
|---|---|---|---|
| 1 | Ground truth optical image | Ground truth optical image | 0.6347 |
| 2 | Ground truth optical image | Translated optical image | 0.517 |
| 3 | Translated optical image (pix2pix) | Translated optical image | 0.624 |
| 4 | Translated optical image (method 200) | Translated optical image | 0.709 |

(ii) Height estimation: Height estimation plays an important role in earth observation tasks by approximating Digital Surface Model (DSM) and Digital Elevation Model (DEM) which are the representations of earth surface and earth's topography, respectively. This will help in creating approximate 3D scene of particular location which can be used for monitoring multi-temporal urban development and large-scale vertical deformations of ground surface. Several works have been published to estimate the height using stereo imagery. But acquiring remote sensing images in stereo mode is highly expensive. The method 200 can be used to get the approximate height of the particular scene using a single image. Since the optical images are not reliable in bad weather conditions and during night time and it is not possible to estimate the absolute height from the SAR image because of its side looking geometry, a new approach is taken. In this approach, the SAR image is translated to optical image using method 200 and then the translated optical image is used to estimate the height. For the experiments, GeoNRW dataset is used for training and DFC2020 dataset is used for testing. GeoNRW dataset consists of ortho-corrected optical images captured aerially, DEMs derived from light detection and ranging (lidar) point clouds, ten class LULC maps. Acquired aerial images are at 10 cm resolution which are then resampled to 1 m resolution to match with the 1 m² lidar point cloud density. The GAN used in method 200 is used with same training parameters. First the GAN is trained using aerial optical images taken from GeoNRW dataset. Then the trained GAN is tested using both ground-truth high resolution optical images from GeoNRW dataset and translated optical images which are generated from low resolution sentinel-1 SAR images comprised in the DFC2020 dataset. The consistency of structural information in translated optical images is comparable with that of the information obtained from conventional methods.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:

receiving, via one or more hardware processors, a Synthetic Aperture RADAR (SAR) image comprising Vertical transmit and Vertical receive (VV) band and Vertical transmit and Horizontal receive (VH) band;

pre-processing, via the one or more hardware processors, the SAR image concatenated with VH/VV band generated from the SAR image;

generating, via the one or more hardware processors, a Land Use Land Cover (LULC) map from the pre-processed image using a first generator of a Generative Adversarial Network (GAN);

concatenating, via the one or more hardware processors, the LULC map with the pre-processed image to obtain a concatenated image; and generating, via the one or more hardware processors, an optical image from the concatenated image using a second generator of the GAN, wherein the GAN comprises the first generator, the second generator and a discriminator, wherein training of the GAN comprises:

receiving a training dataset comprising (i) a plurality of SAR images, (ii) a plurality of estimated LULC maps associated with each of the plurality of SAR images and (iii) one or more ground truth optical images associated with each of the plurality of SAR images;

training the first generator using the plurality of SAR images and the estimated LULC maps comprised in the training dataset to generate a plurality of LULC maps from the plurality of SAR images;

concatenating the generated plurality of LULC maps with the plurality of SAR images to obtain a plurality of concatenated images; and jointly training the second generator and the discriminator for a plurality of training epochs.

2. The method of claim 1, wherein training the second generator comprises:

training the second generator to generate one or more optical images for each of the plurality of SAR images by using the plurality of concatenated images and the one or more ground truth optical images associated with each of the plurality of SAR images;

classifying the generated one or more optical images from second generator as real or fake by the discriminator; and updating the second generator based on an adversarial loss and a supervised loss of the second generator.

3. The method of claim 1, wherein training the discriminator comprises:

training the discriminator using the one or more ground truth optical images and the generated one or more optical images from second generator to classify an image as real or fake; and updating the discriminator based on a classification loss of the discriminator.

4. One or more non-transitory machine-readable information storage mediums comprising one or more instructions which when executed by one or more hardware processors cause:

receiving a Synthetic Aperture RADAR (SAR) image comprising Vertical transmit and Vertical receive (VV) band and Vertical transmit and Horizontal receive (VH) band;

pre-processing the SAR image concatenated with VH/VV band generated from the SAR image;

generating a Land Use Land Cover (LULC) map from the pre-processed image using a first generator of a Generative Adversarial Network (GAN);

concatenating the LULC map with the pre-processed image to obtain a concatenated image; and generating an optical image from the concatenated image using a second generator of the GAN, wherein the GAN comprises the first generator, the second generator and a discriminator, wherein training of the GAN comprises:

receiving a training dataset comprising (i) a plurality of SAR images, (ii) a plurality of estimated LULC maps associated with each of the plurality of SAR images and (iii) one or more ground truth optical images associated with each of the plurality of SAR images;

training the first generator using the plurality of SAR images and the estimated LULC maps comprised in the training dataset to generate a plurality of LULC maps from the plurality of SAR images;

concatenating the generated plurality of LULC maps with the plurality of SAR images to obtain a plurality of concatenated images; and jointly training the second generator and the discriminator for a plurality of training epochs.

5. A system comprising:

a memory storing instructions;

one or more communication interfaces; and one or more hardware processors coupled to the memory via the one or more communication interfaces, wherein the one or more hardware processors are configured by the instructions to:

receive a Synthetic Aperture RADAR (SAR) image comprising Vertical transmit and Vertical receive (VV) band and Vertical transmit and Horizontal receive (VH) band;

pre-process the SAR image concatenated with VH/VV band generated from the SAR image;

generate a Land Use Land Cover (LULC) map from the pre-processed image using a first generator of a Generative Adversarial Network (GAN);

concatenate the LULC map with the pre-processed image to obtain a concatenated image; and generate an optical image from the concatenated image using a second generator of the GAN, wherein the GAN comprises the first generator, the second generator and a discriminator, wherein training of the GAN comprises:

receiving a training dataset comprising (i) a plurality of SAR images, (ii) a plurality of estimated LULC maps associated with each of the plurality of SAR images and (iii) one or more ground truth optical images associated with each of the plurality of SAR images;

training the first generator using the plurality of SAR images and the estimated LULC maps comprised in the training dataset to generate a plurality of LULC maps from the plurality of SAR images;

concatenating the generated plurality of LULC maps with the plurality of SAR images to obtain a plurality of concatenated images; and jointly training the second generator and the discriminator for a plurality of training epochs.

6. The system of claim 5, wherein training the second generator comprises:

training the second generator to generate one or more optical images for each of the plurality of SAR images by using the plurality of concatenated images and the one or more ground truth optical images associated with each of the plurality of SAR images;

classifying the generated one or more optical images from second generator as real or fake by the discriminator; and updating the second generator based on an adversarial loss and a supervised loss of the second generator.

7. The system of claim 5, wherein training the discriminator comprises:

training the discriminator using the one or more ground truth optical images and the generated one or more optical images from second generator to classify an image as real or fake; and updating the discriminator based on a classification loss of the discriminator.

8. The one or more non-transitory machine-readable information storage mediums of claim 4, wherein training the discriminator comprises:

training the discriminator using the one or more ground truth optical images and the generated one or more optical images from second generator to classify an image as real or fake; and updating the discriminator based on a classification loss of the discriminator.

9. The one or more non-transitory machine-readable information storage mediums of claim 4, wherein training the second generator comprises:

training the second generator to generate one or more optical images for each of the plurality of SAR images by using the plurality of concatenated images and the one or more ground truth optical images associated with each of the plurality of SAR images;

classifying the generated one or more optical images from second generator as real or fake by the discriminator; and updating the second generator based on an adversarial loss and a supervised loss of the second generator.

* * * * *